No. 732,572. PATENTED JUNE 30, 1903.
F. MacFARLAND.
GERMICIDE GENERATOR.
APPLICATION FILED MAR. 16, 1903.
NO MODEL. 2 SHEETS—SHEET 1.
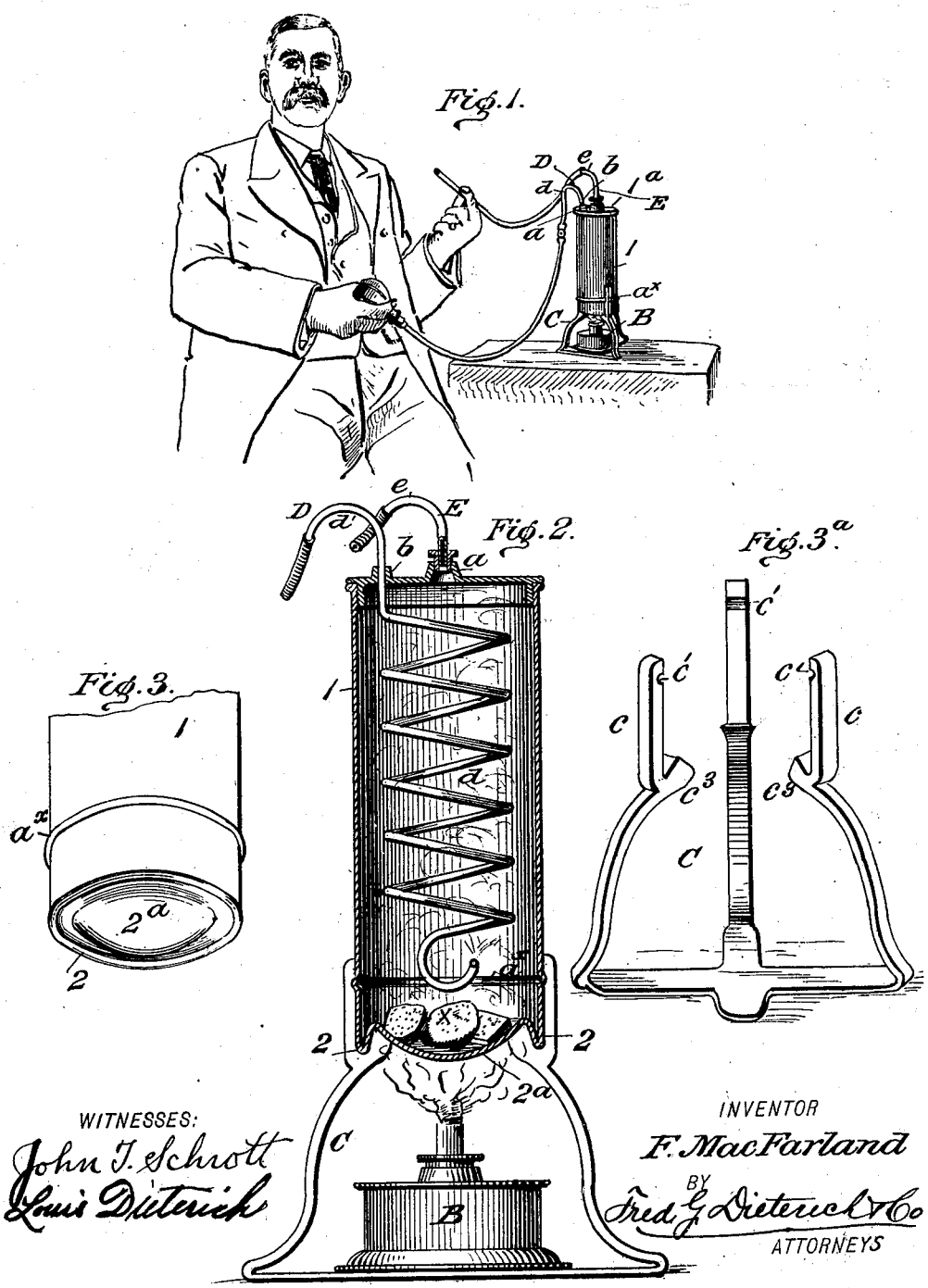
INVENTOR
F. MacFarland No. 732,572. PATENTED JUNE 30, 1903.
F. MacFARLAND.
GERMICIDE GENERATOR.
APPLICATION FILED MAR. 16, 1903.
NO MODEL. 2 SHEETS—SHEET 2.

WITNESSES:
John T. Schrott
Louis Dieterich

INVENTOR
F. MacFarland
BY
Fred G. Dieterich
ATTORNEYS

No. 732,572. Patented June 30, 1903.

UNITED STATES PATENT OFFICE.

FREDERICK MacFARLAND, OF TOPEKA, KANSAS.

GERMICIDE-GENERATOR.

SPECIFICATION forming part of Letters Patent No. 732,572, dated June 30, 1903.

Application filed March 16, 1903. Serial No. 147,952. (No model.)

*To all whom it may concern:*

Be it known that I, FREDERICK MACFARLAND, residing at Topeka, in the county of Shawnee and State of Kansas, have invented a new and Improved Germicide-Generator, of which the following is a specification.

My invention seeks to provide a simple, inexpensive, and effectively-operating means for conveniently generating a germicide which is especially adapted for treating catarrhal and bronchial diseases; and it generically comprehends a vessel, suitable supports for detachably mounting the said vessel over a lamp or heater, the said vessel including a detachable top having an offtake or discharge for the escape of the germicidal vapors, an intake for leading oxygen within the vessel connected with the top, and means for forcing the oxygen under pressure in the vessel to intermix with the medicinal ingredients vaporized therein and for forcing the germicidal vapors from the said vessel.

Figure 4:
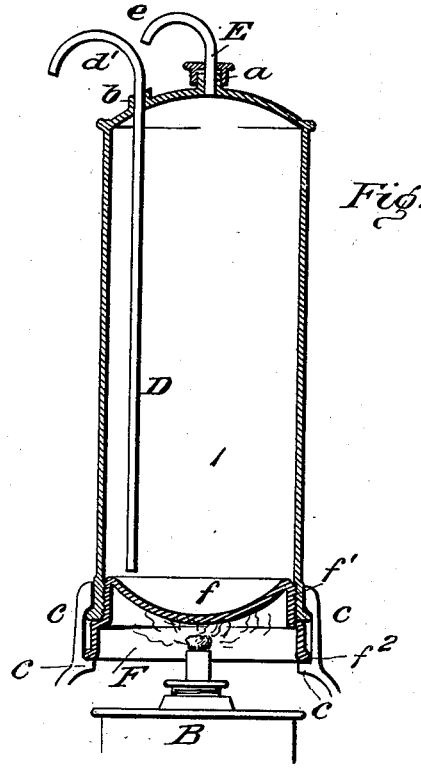
Figure 5:
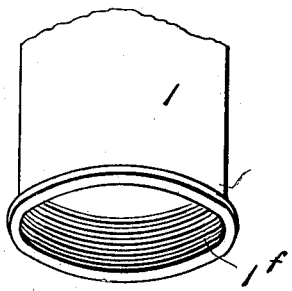
Figure 6:
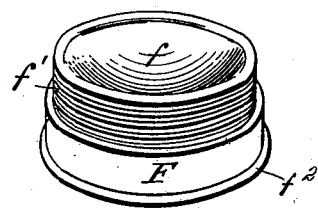

In its more subordinate features my invention consists in certain details of construction and peculiar combination of parts, all of which will hereinafter be fully explained, and specifically pointed out in the appended claims, reference being had to the accompanying drawings, in which—
Figure 1 is a view illustrating the manner in which my invention is used. Fig. 2 is a vertical section of the same, the parts being in their operative position. Figs. 3 and $3^a$ are detail views of the vessel and the support shown in Fig. 2, the parts being separated. Fig. 4 is a vertical section which illustrates a modified construction of my invention. Fig. 5 is an inverted view of the lower end of the form of vessel shown in Fig. 4. Fig. 6 is a perspective view of the removable lower section shown in Fig. 5.

In carrying out my invention I provide a vessel 1, preferably of cylindrical shape and of suitable size—for example, six inches high and three inches in diameter—and which in the construction shown in Fig. 1 has a detachable top $1^a$, provided with one or more outlet-nozzles $a\ a$ and an inlet-nozzle $b$, the purpose of which will presently be explained.
The bottom or lower end of the vessel 1 in the construction shown in Fig. 1 is bent inwardly to form a pendent annular flange 2 and is centrally depressed to form a cup $2^a$ for holding a suitable chemically-prepared pastil, briquet, solution, or powder, whereby the same can be conveniently suspended over a vaporizing media B, which may be an ordinary wood-alcohol burner or lamp, as shown in the drawings, and which in the finished article is supported upon the skeleton base of a cast or wrought metal stand C of ornamental design, whose upper ends terminate in vertically-projected spring-arms $c\ c$, provided with grooves $c'\ c'$ in their upper end to receive the annular bead $a^\times$ on the lower part of the vessel or holder 1, and formed with wedge-shaped brackets $c^3$, adapted to receive the annular pendent flange 2 at the bottom of the vessel 1. The said brackets, the grooves $c'$, the bead $a^\times$ on the lower part of the vessel or holder 1, and the flange 2 have such relative construction whereby to provide a simple and easily-manipulated means for supporting the vessel upon the base C and holding it fast thereon by reason of the spring-snap or interlocking of the several parts mentioned when the vessel 1 is forced down onto the stand C. In the drawings I have shown the vessel provided with but a single discharge $a$; but I desire it understood that the same may have a number of such outlets.

E designates a short pipe connected with the outlet $a$ and provided with a curved or elbow end $e$ to permit of conveniently attaching thereto a flexible tube E', whereby to provide for discharging the vapors from the vessel to such part of the head or throat as desired and as will be readily understood from Fig. 1 of the drawings.

D designates an air-supply pipe which is fitted in the intake $b$ and which may extend straight down to the bottom of the vessel, as shown in Fig. 4, to discharge the oxygen directly into the fumes that arise from the medicated substance X or it may be and preferably is formed with a series of coils within the vessel, as shown in Fig. 1, the latter construction being preferred, for the reason that the oxygen forced into the vessel in passing through the coils $d$ is thoroughly heated, and thereby not only prevents chilling the medicated substance, but by reason of the expanded condition of the oxygen when it passes from the pipe-coils $d$ the same more thoroughly mixes with the medicated vapors, and thereby produces a perfect generation of the germicide. The exit end of the pipe D is so disposed as to create an upward draft in the vessel, and thereby force the fumes or germicide under pressure into the discharge-pipe E.

From the foregoing description, taken in connection with the accompanying drawings, it is believed the manner in which my invention is used will be clearly understood. When the appliance is arranged as shown in Figs. 1 and 2, to render the operation the tube $1^a$ is removed and the medicated tablets or solution is placed in the vessel 1, which seats in the cup $2^a$ at the bottom. The tube $1^a$ is then replaced air-tight, and the vessel is then heated by the lamp B. It should be stated that the flexible tube D' is provided with an air-bulb $D^2$ and a check-valve, and by manipulating the bulb $D^2$ at desired intervals the patient can cause the germicide-gases generating within the vessel 1 to discharge in such puffs or volume as he may find most convenient and effective, it being understood that when pressure is relieved from the bulb $D^2$ the pipe D is cut off from atmospheric pressure, and hence little or none of the gases within the vessel pass out of the pipe E'.

While I prefer to employ the form of generator devices shown in Figs. 1 and 2, the said construction may be readily modified without departing from the scope of the appended claims. For example, instead of having the top of the vessel removable said top may be a fixed part of the vessel, as shown in Fig. 4, in which the lower end of the vessel is open and in which is detachably fitted a removable bottom F, of an inverted-cup shape, whose top or crown $f$ is concaved to form a pocket to receive the medicated substance, and to permit of conveniently applying or removing the said bottom F it has an externally-threaded portion $f'$, adapted to engage an internally-threaded portion $1^f$ in the lower end of the vessel 1. This latter form of my invention has one advantage over the form shown in Fig. 1, in that the vessel can be easily charged with the medicated substance without detaching the pipes D and E and their attached tubes from the vessel, as the said bottom F can be quickly unscrewed from the bottom 1, the concaved top $f$ and the said bottom F then quickly replaced. The stand or support C in the latter form of my invention also includes the spring members $c$ $c$, which are, however, slightly modified in shape to suit the bottom of the vessel, such as will be clearly shown in Fig. 4.

Having thus described my invention, what I claim, and desire to secure by Letters Patent, is—

1. An appliance for generating the germicide; comprising a vessel having a cup-shaped bottom provided with an annular pendent flange, a support for the vessel including spring-arms adapted to straddle the flanged lower end of the vessel and to interlock with said lower ends, said vessel including a detachable portion, a discharge and an inlet in the upper end thereof, a flexible tube connected to the discharge, an air-tight pipe extended within the vessel, a flexible tube joined with said air-pipe, an air-bulb and a check-valve connected with said air-tube, all being arranged substantially as shown and described.

2. In a germicide-generator as described, the combination of a vessel having an air-inlet and a gas-outlet in the upper end thereof, a flexible tube joined with the outlet, a pipe extended through the inlet down into the vessel, a flexible tube connected to the said pipe, an air-pressure bulb joined to the said pipe-tube, a medicant-holding cup detachably connected to the lower end of the vessel, a supporting means, said supporting means including members for interlocking with the lower end of the vessel and its cup, all being arranged substantially as shown and for the purposes described.

FREDERICK MacFARLAND.

Witnesses:
LOUIS R. CASEBIER,
N. G. SIMPSON.